United States Patent
Tanavde et al.

(10) Patent No.: US 11,063,491 B2
(45) Date of Patent: Jul. 13, 2021

(54) GENERATOR MOUNTING ADAPTOR

(71) Applicant: General Electric Company, Schenectady, NY (US)

(72) Inventors: Anand Shankar Tanavde, Slingerlands, NY (US); Donald Michael Ronca, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 233 days.

(21) Appl. No.: 16/194,925

(22) Filed: Nov. 19, 2018

(65) Prior Publication Data
US 2020/0161932 A1 May 21, 2020

(51) Int. Cl.
| | |
|---|---|
| H02K 5/26 | (2006.01) |
| H02K 7/18 | (2006.01) |
| F01D 15/10 | (2006.01) |
| F01D 25/28 | (2006.01) |

(52) U.S. Cl.
CPC .............. *H02K 5/26* (2013.01); *F01D 15/10* (2013.01); *F01D 25/28* (2013.01); *H02K 7/1823* (2013.01); *F05D 2220/31* (2013.01); *F05D 2220/32* (2013.01); *F05D 2220/76* (2013.01); *F05D 2240/91* (2013.01)

(58) Field of Classification Search
CPC ........ H02K 5/26; F01D 15/10; D02K 7/1823; F05D 2220/31; F05D 2220/32; F05D 2220/76; F05D 2240/90; F05D 2240/91; F16M 7/00

See application file for complete search history.

(56) References Cited

U.S. PATENT DOCUMENTS

| | | | | |
|---|---|---|---|---|
| 596,280 | A * | 12/1897 | Short ....................... | F16M 7/00 248/656 |
| 2,217,788 | A * | 10/1940 | Winchester .............. | H02K 5/00 248/638 |
| 2,554,226 | A | 5/1951 | Taylor | |
| 2,777,665 | A * | 1/1957 | Martinson ............... | F01D 25/28 415/134 |
| 5,815,992 | A * | 10/1998 | Wells ....................... | F16B 19/02 52/126.1 |
| 6,171,540 | B1 * | 1/2001 | Ibaragi .................... | B29C 45/00 248/200 |
| 6,439,561 | B1 * | 8/2002 | Ausilio ................... | B23Q 3/103 269/238 |
| 6,657,357 | B2 | 12/2003 | Boardman et al. | |
| 6,712,516 | B1 * | 3/2004 | Giberson .............. | F01D 25/164 384/215 |
| 7,923,890 | B2 | 4/2011 | Boardman, IV et al. | |

(Continued)

FOREIGN PATENT DOCUMENTS

EP 3211766 A1 8/2017

*Primary Examiner* — Christopher Garft
(74) *Attorney, Agent, or Firm* — Hoffman Warnick LLC

(57) ABSTRACT

A generator system includes an electrical generator; a generator casing disposed around the electrical generator; at least one rail structure axially disposed on an outer surface of the generator casing; at least one adaptor plate coupled to the rail structure, the adaptor plate including a substantially rectangular shape. The adaptor plate includes: at least one rabbet feature; and a plurality of bolt holes disposed therethrough. The generator system includes at least one structural foot coupled to the adaptor plate.

19 Claims, 5 Drawing Sheets

(56) References Cited

U.S. PATENT DOCUMENTS

| | | | |
|---|---|---|---|
| 2005/0218288 A1* | 10/2005 | Allen | F02B 63/04 248/637 |
| 2007/0101713 A1* | 5/2007 | Battig | F02C 7/20 60/598 |
| 2008/0317591 A1* | 12/2008 | Golinkin | F01D 25/28 415/213.1 |
| 2012/0007457 A1* | 1/2012 | Andersson | H02K 5/26 310/91 |
| 2012/0193493 A1* | 8/2012 | Rekasch | F16B 5/0216 248/226.11 |
| 2012/0228974 A1* | 9/2012 | Rinaolo | F16M 9/00 310/91 |
| 2013/0106114 A1* | 5/2013 | Wang | F16M 7/00 290/1 A |
| 2014/0250915 A1* | 9/2014 | Swan | F01D 9/04 60/796 |
| 2016/0161048 A1* | 6/2016 | Davi | F16M 1/00 248/651 |
| 2017/0250593 A1* | 8/2017 | Arai | F16M 7/00 |
| 2019/0146046 A1* | 5/2019 | Kralick | G01R 33/3802 248/205.1 |

\* cited by examiner

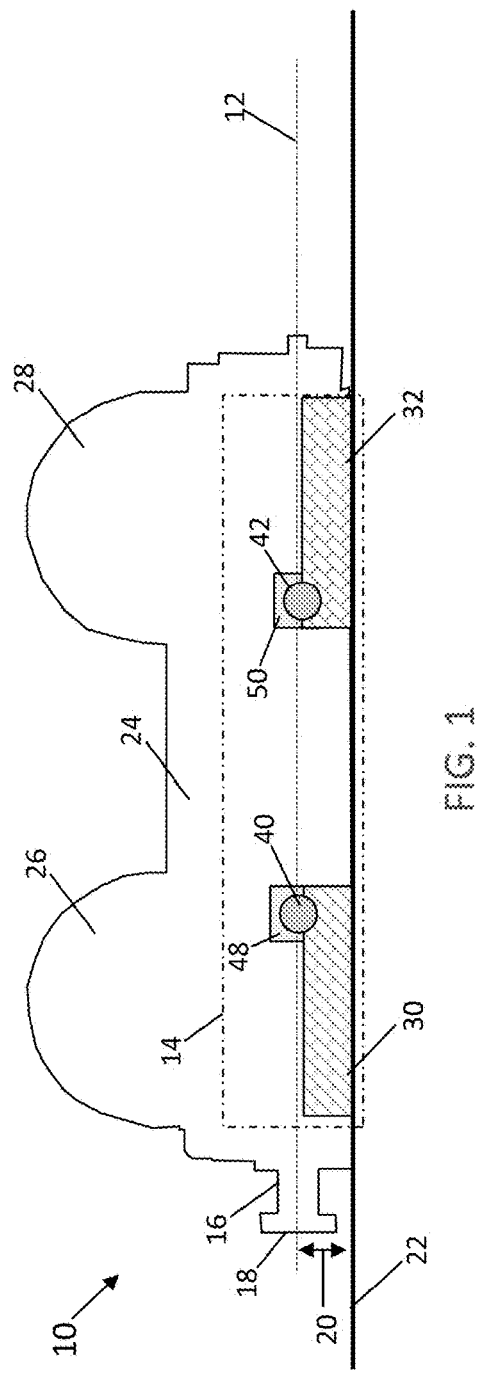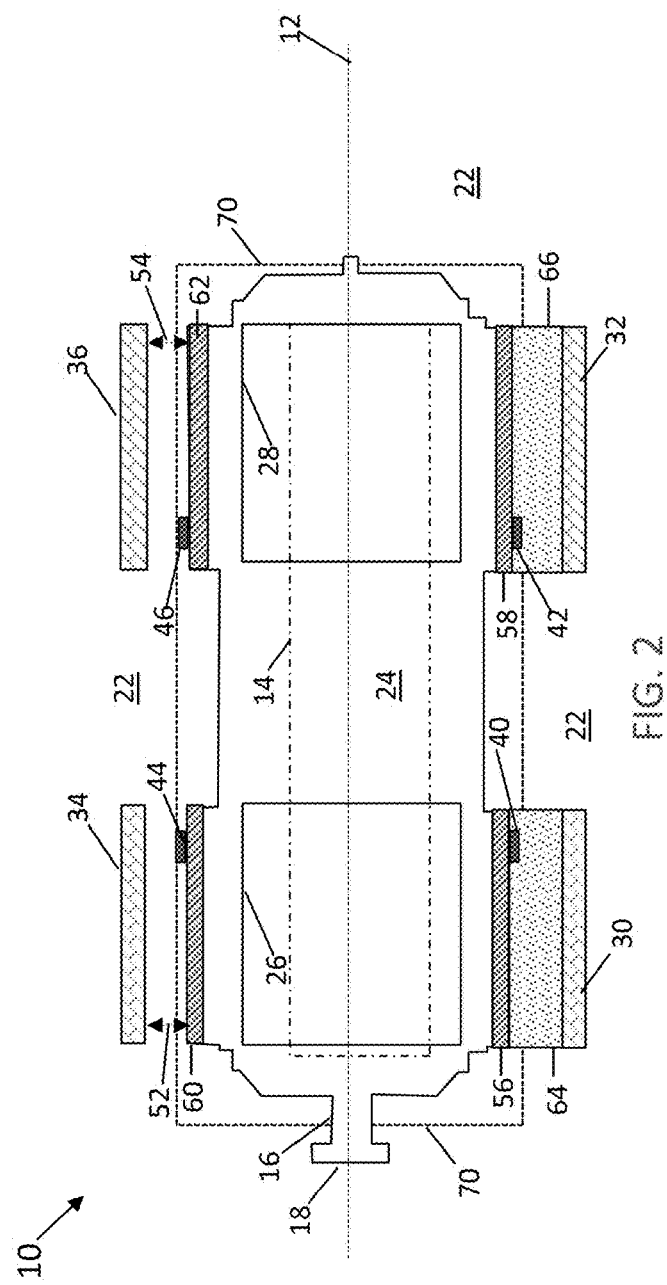

GENERATOR MOUNTING ADAPTOR

BACKGROUND

The present subject matter relates generally to an electrical generator, and more specifically to an adaptor for structurally supporting a generator.

Electrical generators are among the heaviest components of modern power generation facilities (i.e., power plants). Concrete foundations used to support generators includes several to thousands of tons of concrete in order to structurally support electrical generators, which themselves may weigh as much as 1000 tons. The cure time for these concrete structures may be as long as 28 days.

As electrical generators reach the end of their useful lives and require replacement and/or refurbishing (often after several years or decades in service), replacement generators may match the same electrical ratings and outputs as the older generators, and may do so while occupying a smaller overall footprint. Technological advancements have allowed generators to become more efficient, yielding higher power densities (i.e., high power per unit volume). Therefore, a newer generator that matches the power output of an older generator may be expected to have a smaller footprint and/or volume than the older generator Structurally supporting new generators in existing power plants may present technical challenges when the footprint of the new generator does not match that of the old generator. In addition, rebuilding a power plant to include new foundational configurations is both time-consuming and costly.

BRIEF DESCRIPTION OF THE EMBODIMENTS

Aspects of the present embodiments are summarized below. These embodiments are not intended to limit the scope of the present claimed embodiments, but rather, these embodiments are intended only to provide a brief summary of possible forms of the embodiments. Furthermore, the embodiments may encompass a variety of forms that may be similar to or different from the embodiments set forth below, commensurate with the scope of the claims.

In one aspect, a generator system includes an electrical generator; a generator casing disposed around the electrical generator; at least one rail structure axially disposed on an outer surface of the generator casing; at least one adaptor plate coupled to the rail structure, the adaptor plate including a substantially rectangular shape. The adaptor plate includes: at least one rabbet feature; and a plurality of bolt holes disposed therethrough. The generator system includes at least one structural foot coupled to the adaptor plate.

In another aspect, a method of supporting a generator includes: providing at least one adaptor plate, the adaptor plate includes: at least one rabbet feature; and at least one bolt hole disposed therethrough; aligning the adaptor plate with at least one rail structure of the generator; bolting the adaptor plate to the rail structure; aligning bolt hole with at least one structural foot; and bolting the adaptor plate to the structural foot.

In another aspect, an adaptor includes: a substantially rectangular plate including a front side and a back side, each of the front side and the back side further including: at least one recess portion; and at least rabbet feature, wherein the substantially rectangular plate includes at least one plurality of holes disposed therethrough. Each hole of the plurality of holes is spaced along a length of the substantially rectangular plate.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a side schematic representation of a generator;

FIG. 2 is a top schematic representation of a generator;

Figure 3:
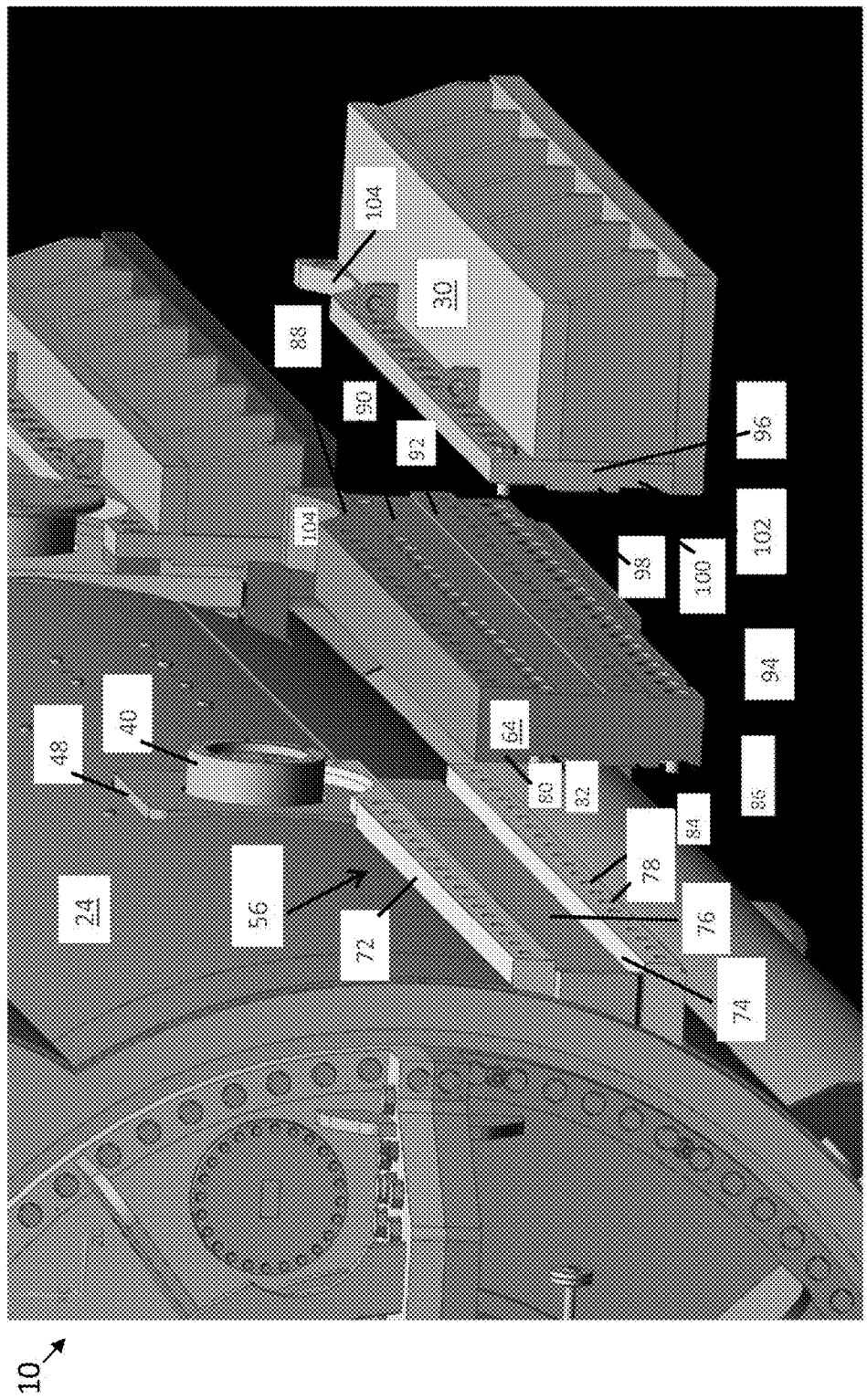
FIG. 3 is perspective view of a mounting adaptor assembly.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "axial" refers to a direction aligned with a central axis or shaft of a generator.

As used herein, the term "circumferential" refers to a direction or directions around (and tangential to) the outer circumference of the generator, or for example the circle defined by the swept area of the rotor of the generator. As used herein, the terms "circumferential" and "tangential" may be synonymous.

As used herein, the term "radial" refers to a direction moving outwardly away from the central axis of the generator. A "radially inward" direction is aligned toward the central axis moving toward decreasing radii. A "radially outward" direction is aligned away from the central axis moving toward increasing radii.

FIG. 1 illustrates a sideview of a generator 10 rotatable about a generator centerline 12. A generator rotor 14 is axisymmetric about the centerline 12 and is mechanically coupled to a shaft 16 which in turn is coupled to a coupling 18 for attaching the generator to a power generating device such as a gas turbine or a steam turbine. The generator centerline 12 may be located a first height 20 above a turbine deck 22. The first height 20 may be, for example, 30 inches, 36 inches, 20 inches, 45 inches or some other height. If a radius of the rotor 14 is greater than the first height 22, than the radially outer portions of the rotor 14 will rotate through a height (or depth) that is below the turbine deck 22.

The generator 10 includes a generator casing 24 which is disposed radially outward of the rotor 14. A first hood 26 and a second hood 28 may be disposed on a top portion of the generator casing 24. The generator may include a first structural foot 30 and a second structural foot 32. Both of the first and second structural feet 30, 32 may be attached to the turbine deck 22 for structurally supporting the generator. The generator 10 may also include a first trunnion 40 and a second trunnion 42 used for lifting the generator 10. A first mounting plate 48 and a second mounting plate 50 may be disposed around the first and second trunnions 40, 42 at the respective interfaces with the generator casing 24, in order to fortify the casing 24 and trunnion-casing interfaces. The first and second trunnions 40, 42 (as well as third and fourth trunnions 44, 46, not shown disposed on the opposite side of the generator 10) may be used to move the generator 10 (for example, by connecting a crane to the trunnions) without damaging the generator and/or any internal components. The first, second, third, and fourth trunnions 40, 42, 44, 46 may be substantially cylindrically shaped and may extend radially outward from the generator casing 24.

FIG. 2 illustrates a top view of the generator 10. The illustration of FIG. 2 is aligned with the illustration of FIG. 1 such that common features may approximately line up. The illustration of FIG. 2 includes the generator rotor 14 axisymmetric and rotatable about the generator centerline 12, and disposed within the generator casing 24. FIG. 2 also includes an outline of a floor recess 70, in which the generator 10 sits. The floor recess 70 occupies a greater area or footprint than that of the generator 10. Stated otherwise, the floor recess 70 may correspond to the footprint of an older generator (not shown) that has been replaced, or is in the process of being replaced. The generator 10 may be a new generator that is being installed in place of the older generator and occupies less volume and area than the old generator, despite bring rated at the same or equivalent electrical output as the older generator (i.e., due to technological advances).

Still referring to FIG. 2, the generator 10 includes the first, second, third, and fourth trunnions extending radially outward from the generator 10. The generator 10 includes the first and second structural feet 30, 32 as well as a third and fourth generator feet 34, 36 disposed on the opposite side of the generator 10 from the first and second structural feet 30, 32. When installed, each of the first, second, third, and fourth structural feet 30, 32, 34, 36 are bolted and/or mechanically coupled to the turbine deck 22. First, second, third, and fourth rail structures 56, 58, 60, and 62 are disposed on the outside of the generator casing 24 radially inward of the first, second, third, and fourth structural feet 30, 32, 34, 36. A first gap 52 occupies the radial space between the third rail structure 60 and the third structural foot 34, while a second gap 54 occupies the radial space between the fourth rail structure 62 and the fourth structural foot 36. The placement of each of the first, second, third, and fourth structural feet 30, 32, 34, 36 is fixed due to the requirement that they be coupled to the turbine deck 22, but also due to the requirement that they be coupled to specific locations on the turbine deck 22 that correspond to the interfaces with the concrete foundation. The first, second, third, and fourth rail structures 56, 58, 60, and 62 may also be fixed features of the generator 10, designed to distribute and support the load evenly across a wide area.

Referring to still to FIG. 2, a first adaptor plate 64 spans the radial gap (not shown) between the first structural foot 30 and the first rail structure 56. Similarly, a second adaptor plate 66 spans the radial gap (not shown) between the second structural foot 32 and the first rail structure 58. When fully installed and structurally supported, the generator 10 may include an adaptor plate spanning the radial gaps between each of the rail structures and structural feet (i.e., for a total of four adaptor plates). FIG. 2 illustrates first and second adaptor plates 64, 66, but not third and fourth adaptor plates (not shown) in order to illustrate the first and second radial gaps 52, 54. Each of the first through fourth adaptor plates may be bolted and/or coupled to the both the respective rail structures and the structural feet, thereby spanning the radially gaps and serving to structurally support the generator.

FIG. 3 illustrates a perspective view of the generator 10 including, the generator casing 24 disposed around a generator rotor (not shown), the first trunnion 40, the mounting plate 48, the first rail structure 56, the first adaptor plate 64, and the first structural foot 30. In the embodiment of FIG. 3, the first adaptor plate 64 and the first structural foot 30 are disassembled from each other and from the first rail structure 56. The first rail structure 56 may include a top rail 72, a bottom rail 74 and a center recess portion 76 disposed between the top and bottom rails 72, 74. Each of the top and bottom rails 72, 74 may include a plurality of bolt holes 78 aligned axially. On a back (i.e., radially inward) side, the adaptor plate 64 may include a top rear rabbet feature 80, a top rear recess 82, a bottom rear rabbet feature 84, and a bottom rear recess 86. The top rear recess 82 includes a plurality of bolt holes that correspond with the plurality of bolt holes 78 disposed in the top rail 72, while the bottom rear recess 86 includes a plurality of bolt holes that correspond with the plurality of bolt holes 78 disposed in the bottom rail 74. The bottom rear rabbet feature 84 corresponds to and fits within the center recess portion 76 of the first rail structure 56. On a front (i.e., radially outward) side, the adaptor plate 64 may include a top front rabbet feature 88, a top front recess 90, a bottom front rabbet feature 92, and a bottom front recess 94.

Referring still to FIG. 3, the first structural foot 30 may include a back plate 96 that interfaces with the adaptor plate 64. The back plate 96 may include a top plate recess 98, a bottom plate recess 102, and a plate center rabbet feature 100 disposed between the top and bottom plate recesses 98, 102. Each of the top and bottom plate recesses 98, 102 may include a plurality of bolt holes aligning with and corresponding to respective pluralities of bolt holes in the top and bottom front rabbet features 88, 92 of the adaptor plate 64. The center rabbet feature 100 corresponds to and fits within the top front recess 90 of the adaptor plate 64. Each of the first structural foot 30 and the adaptor plate 64 may include a rounded trunnion recess 104 allowing the first structural foot 30 and the adaptor plate 64 to abut the generator casing 24 and/or first rail structure 56 without interfering with the first trunnion 40. Each trunnion recess 104 may be semicircular and/or semi-cylindrical (i.e., half of a cylinder).

Figure 4:
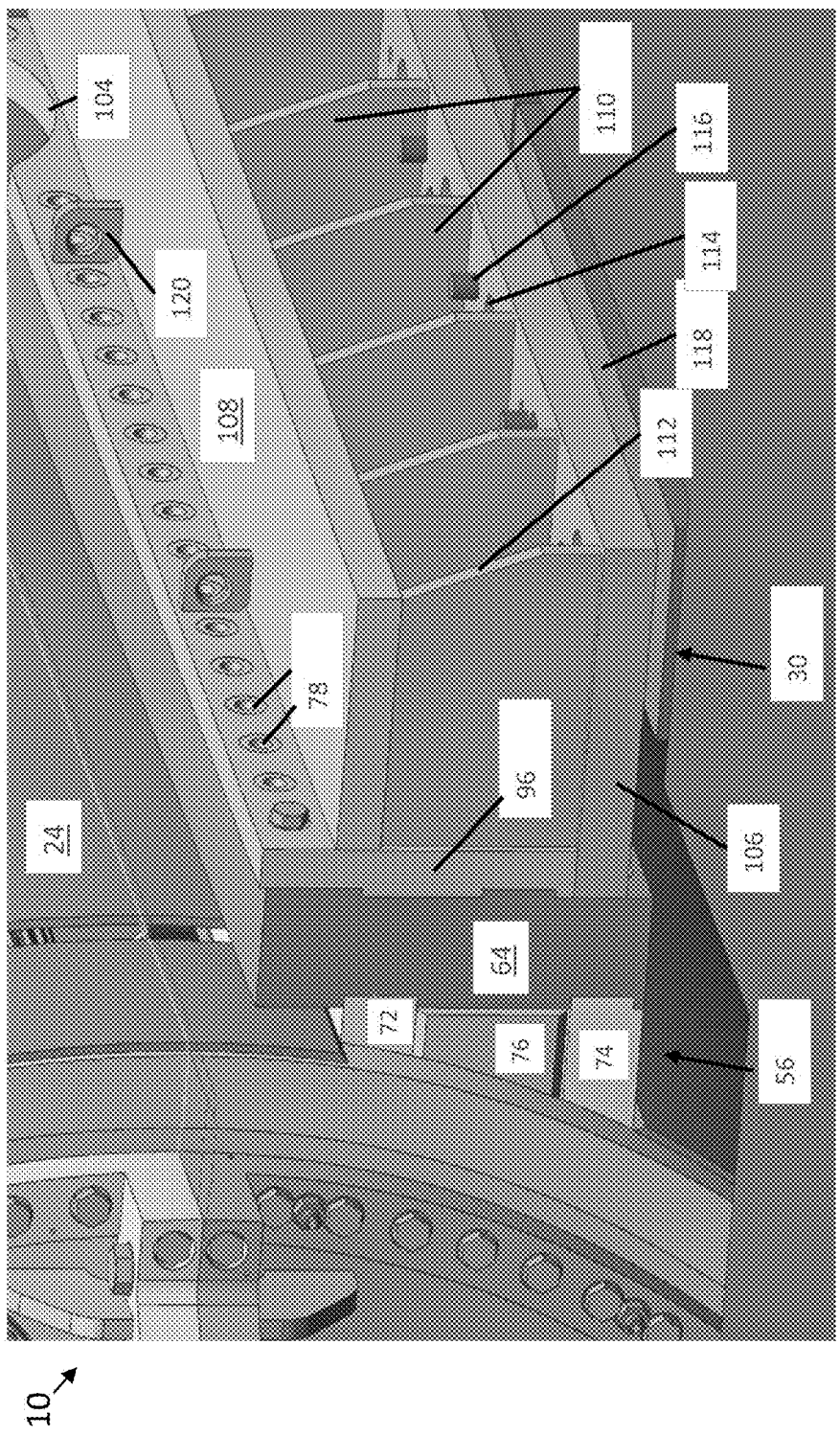
FIG. 4 is perspective view of a generator assembly.

FIG. 4 illustrates a perspective view of the generator 10, generator casing 24, and trunnion recess 104 with the first structural foot 30 and adaptor plate 64 assembled to the first rail structure 56 at the top and bottom rails 72, 74 and at the center recess portion 76. The first structural foot 30 may include a bottom plate disposed beneath the back plate 96 and a top plate 108. The back plate 96 may include at least one plurality of bolt holes for interfacing with the adaptor plate 64. The first structural foot may also include a plurality of vertical plates 110 extending between the bottom plate 106 and the top plate 108. Each vertical plate 110 may be 5-sided, and include 4 sides that are parallel with and/or orthogonal to at least one other side. Each vertical plate 110 may also include at least one angled side 112, which may provide both vertical and lateral support. The plurality of vertical plates 110 may collectively define a plurality of spaces therebetween. The bottom plate 106 may include at least one bolt hole 114 and at least one bolt 116 disposed therethrough at axial locations corresponding to the plurality of spaces defined by the plurality of vertical plates 110.

Referring still to FIG. 4, the bottom plate 106 may be bolted via the at least one bolt hole 114 and the at least one bolt 116 to a foundation interface 118 that is structurally coupled to and/or integral with the concrete foundation. The first structural foot 30 may also include at least one mounting bracket 120 used for moving and/or maneuvering the first structural foot 30 during assembly (i.e., by attaching a crane, forklift, and/or other maneuvering means to the one or more mounting bracket 120). When assembled, each of the rabbet features disposed in the first rail structure 56, the first adaptor plate 64, and the first structural foot 30, (in connection with each of the recesses disposed in the same) collectively serve to absorb shear loads and/or stresses, thereby substantially reducing the shear loading and/or stresses on the several bolts that are used to hold the assembly together.

Figure 5:
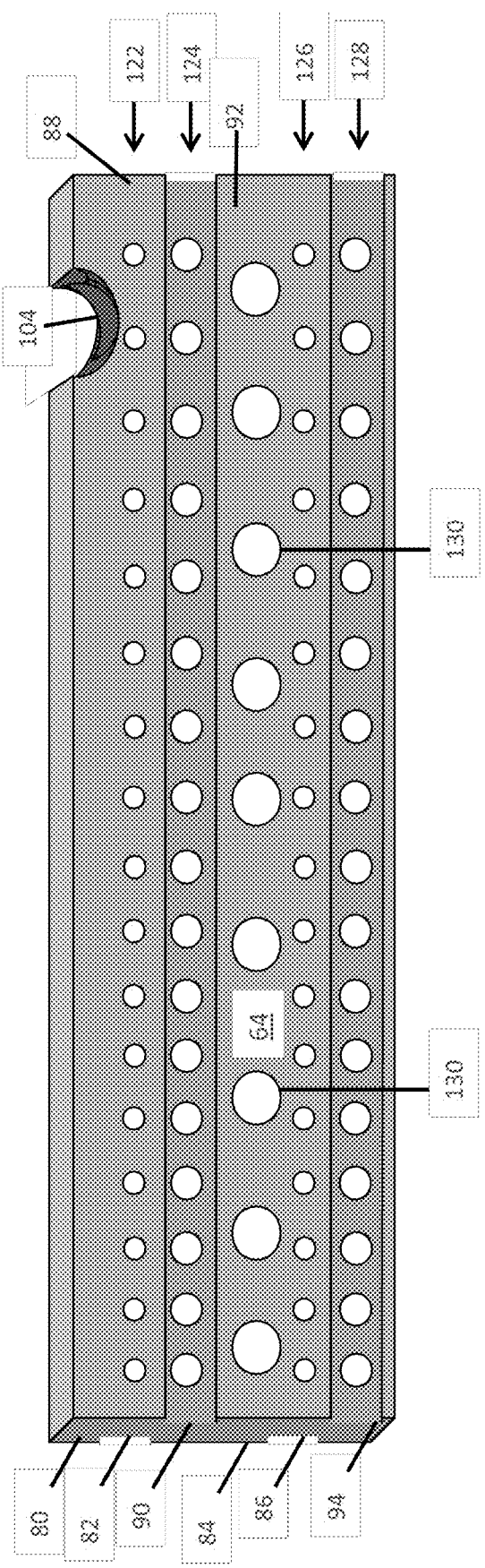
FIG. 5 is perspective view of an adaptor.

FIG. 5 illustrates a perspective view of the first adaptor plate 64, including the top rear rabbet feature 80, the top rear recess 82, the bottom rear rabbet feature 84, and the bottom rear recess 86, as well as the top front rabbet feature 88, the top front recess 90, the bottom front rabbet feature 92, the bottom front recess 94, and the trunnion recess 104. The adaptor plate 64 may be substantially rectangular and may also include: a first plurality of holes 122 disposed in the top front and rear rabbet features 88, 80; a second plurality of holes 124 disposed in the top front and rear recesses 90, 82; a third plurality of holes 126 disposed in the bottom front and rear rabbet features 92, 84; and, a fourth plurality of holes 128 disposed in the bottom front and rear recesses 94, 86. Each of the first and third pluralities of holes 122, 126 (and respective bolts and nuts) may be used to secure the adaptor plate 64 to the first structural foot 30 while each of the second and fourth pluralities of holes 124, 128 (and respective bolts and nuts) may be used to secure the adaptor plate 64 to the first rail structure 56. Each of the first and third pluralities of holes 122, 126 may include smaller diameters than each of the second and fourth pluralities of holes 124, 128. In other embodiments, each of the first and third pluralities of holes 122, 126 may include larger diameters than each of the second and fourth pluralities of holes 124, 128. In other embodiments, each of the first and third pluralities of holes 122, 126 may include diameters that are substantially the same as each of the second and fourth pluralities of holes 124, 128. One or more drilling process may be used to create each of the bolt holes of the present embodiments while one or more milling processes may be used to create each of the rabbet features and/or each of the recesses of the present embodiments. Other processes may also be used to create the bolt holes and/or the rabbet features.

Still referring to FIG. 5, the adaptor plate 64 may include one or more weight reduction features 130 disposed therethrough. The one or more weight reduction features 130 may be disposed within any portion of the adaptor plate 64 including, for example, the top rear rabbet feature 80, the top rear recess 82, the bottom rear rabbet feature 84, and the bottom rear recess 86, as well as the top front rabbet feature 88, the top front recess 90, the bottom front rabbet feature 92, and/or the bottom front recess 94. The one or more weight reduction features 130 may include circular and/or non-circular cross sections (for example rectangular, triangular, elliptical, cubic, as well as other shapes). The one or more weight reduction features 130 may be disposed from the front side of the adaptor plate 64 all the way through to the back side of the adaptor plate. In other embodiments, the one or more weight reduction features 130 may be disposed in the front and/or the back and may not go all the way through. Multiple weight reduction features 130 of different sizes and/or shapes may be disposed in the adaptor plate 64 in various configurations and/or arrangements. For example, a plurality of between 5 and 15 weight reduction features 130 may be axially space along the length of the adaptor plate 64. In other embodiments, plurality of weight reduction features 130 may be staggered at different heights and axial location, the plurality of weight reduction features 130 themselves including multiple sizes and shapes. Other configurations according to the embodiments disclosed herein and as dictated by the desired design characteristics, are also possible.

Referring still to FIG. 5, the one or more weight reduction features 130 allow both the frequency and the weight of the adaptor plate 64 to be tuned such that they yield the desired resulting weight and/or frequency characteristics of the generator system (including the generator and mounting components). An indirect benefit of the weight of the adaptor plate 64 is that it may serve to increase the sudden short circuit torque capability of the existing foundation anchor bolts when secured thereto via the structural feet 30, 32, 34, 36. By controlling the weight of the adaptor plate 64, 66 it is possible to reduce the tension on the existing foundation anchor bolts. Generally, it is difficult or impossible to replace the existing anchor bolts on uprated MW generators without expensive and time-consuming foundation work needed to install new bolts. The weight of the adaptor plate may act as a counteracting moment, and may reduce the force in the bolts.

Figure 6:
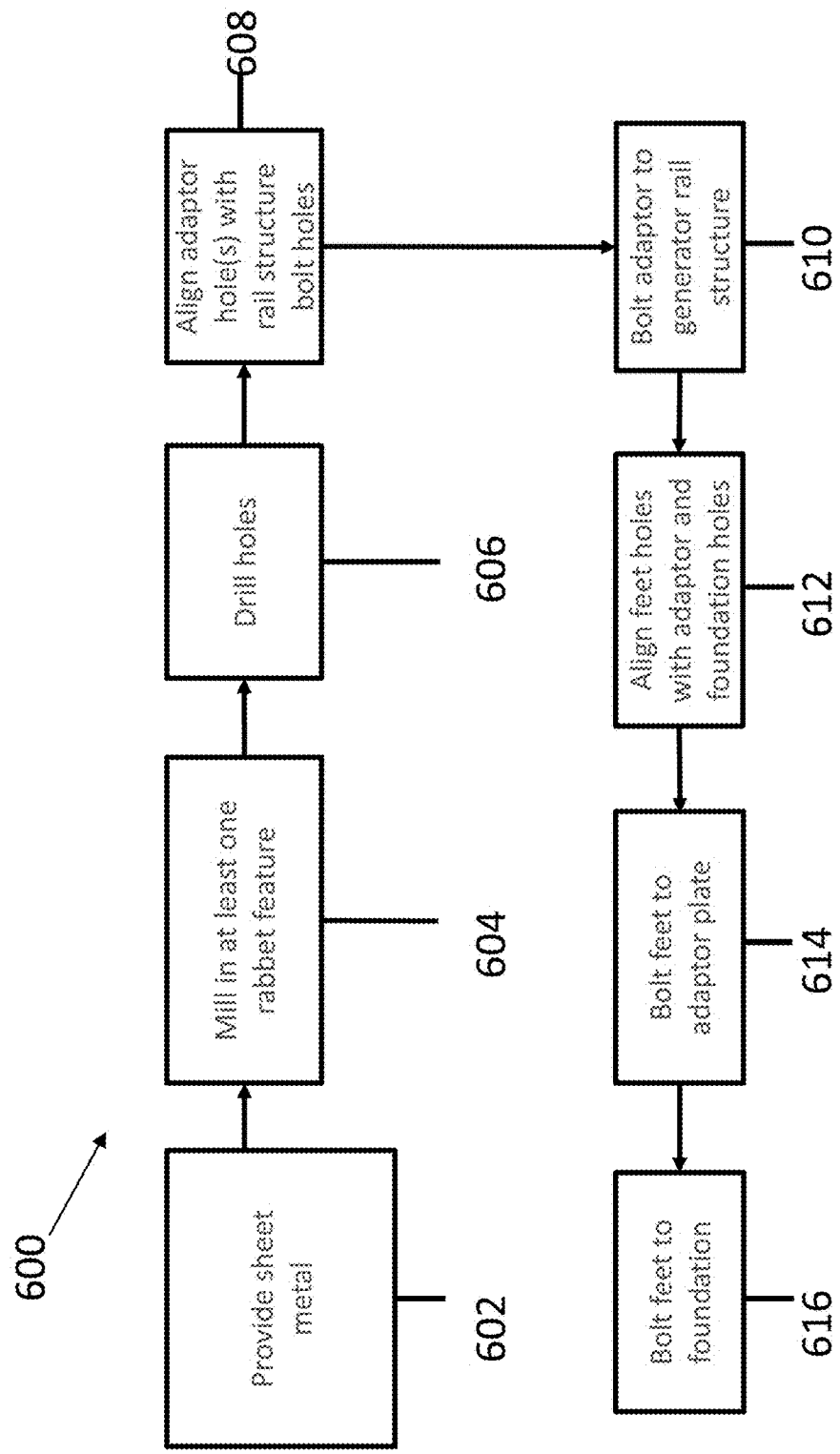
FIG. 6 is a method of supporting a generator, according to aspects of the present embodiments.

FIG. 6 illustrates a schematic of a method 600 of structurally supporting the generator 10. At step 602, the method 600 may include providing sheet metal. The sheet metal may be composed at least partially of A36 steel as well as other suitable materials. The sheet metal may be between about 6 and about 8 inches thick. In other embodiments, the sheet metal may be between about 5 and about 10 inches thick. In other embodiments, the sheet metal may be between about 4 and about 12 inches thick. In other embodiments, the sheet metal may be between about 2 and about 16 inches thick. At step 604, the method 600 may include milling at least one rabbet feature and/or recess into the sheet metal. At step 606, the method 600 may include drilling at least one hole through the sheet metal, thereby creating the adaptor plate 64, 66. At step 608, the method may include aligning the adaptor plate hole(s) with the plurality of holes 78 in the rail structure 56, 58, 60, 62. At step 610, the method 600 may include bolting the adaptor plate 64, 66 to the rail structure 56, 58, 60, 62. At step 612, the method 600 may include aligning holes within the structural feet 30, 32, 34, 36 with the holes in the foundation and/or foundation interface 118. At step 614, the method 600 may include bolting the structural feet 30, 32, 34, 36 to the adaptor plate 64, 66. At step 616, the method 600 may include bolting the structural feet 30, 32, 34, 36 to the foundation and/or foundation interface 118. In embodiments of the disclosed method, other steps may also be performed. In other embodiments of the disclosed method, one or more of the disclosed steps may be omitted. In addition, in embodiments of the disclosed method, one or more of the steps may be performed in a different order. For example, in some embodiments, step 616 may be performed before step 614.

Each of the embodiments and/or methods disclosed in FIGS. 1-6 may include any and all of the illustrated features of the first adaptor plate 64, the first rail structure 56, and the first structural foot 30, on or in connection with the second, third, and fourth adaptor plates, rail structures, and structural feet. In addition, embodiments disclosed herein may include rail structures, adaptor plates and structural feet that extend the entire axial length of the generator 10, on either side. By providing an adaptor plate 64, 66 that matches the features of each of the rail structures 56, 58, 60, 62 and structural feet 30, 32, 34, 36, the embodiments and methods disclosed herein allow new or refurbished generators to be mounted and structurally supported in power plants where an existing generator footprint is larger and/or different than that of the new or refurbished generator 10. The rabbet features of each of the adaptor plate 64, 66, the rail structures 56, 58, 60, 62, and the structural feet 30, 32, 34, 36 distribute and transfer sheer stresses and loads. In addition, the adaptor plate 64, 66 allows for a less costly mounting system than other systems, and enables a structural interface with the existing structural feet 30, 32, 34, 36 (and concrete foundation) without requiring modifications to the generator design or components thereof. The embodiments disclosed herein allow generators to be installed in existing plants without modifications to the generator frame; modifying the generator frame may be timely, costly, and/or result in undesirable changes to the generator vibration signature. The embodiments disclosed herein may include other adaptor plate dimensions, geometries, rabbet feature configurations, and bolt hole configurations, as necessary to match the corresponding generator and installation arrangements.

Exemplary applications of the present embodiments may include steam turbine generators, gas turbine generators, rotary engine generators, reciprocating engine generators, air-cooled generators, gas-cooled generators, fluidly-cooled generators, three-phase generators, and/or other types of generators.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A generator system comprising:
an electrical generator;
a generator casing disposed around the electrical generator;
a rail structure axially disposed on an outer surface of the generator casing;
an adaptor plate coupled to the rail structure; and
a structural foot coupled to the adaptor plate,
wherein the adaptor plate has a rail structure-facing side and an opposite, structural foot-facing side,
wherein the structural foot-facing side includes a first protruding feature and a second protruding feature radially spaced from the first protruding feature, the first and the second protruding features each including a respective plurality of holes entirely disposed therethrough, and
wherein the rail structure further including:
a top rail;
a bottom rail; and
a recess portion disposed between the top rail and the bottom rail,
wherein the top rail and the bottom rail each includes a respective plurality of holes disposed therethrough, and
the top rail and the bottom rail are coupled to the adaptor plate through the respective plurality of holes of the top rail and the bottom rail.

2. The generator system of claim 1, further comprising:
a trunnion protruding radially outward from the generator casing; and
a mounting plate disposed at an interface between the trunnion and the generator casing.

3. The generator system of claim 1,
wherein the rail structure is disposed on a length-wise side of the generator;
the adaptor plate is disposed on the length-wise side of the generator; and
the structural foot is disposed on the length-wise side of the generator.

4. An adaptor for a generator system, the generator system including an electrical generator, a generator casing disposed around the electrical generator, and a rail structure axially disposed on an outer surface of the generator casing, the adaptor comprising:
a substantially rectangular plate comprising a first side and an opposite, second side, each of the first side and the second side further comprising:
at least one recess portion; and
at least one protruding feature,
wherein the substantially rectangular plate comprises at least one plurality of holes disposed therethrough,
the at least one plurality of holes further including four plurality of holes with each plurality of the four plurality of holes radially spaced from each other, the four plurality of holes further including:
a first plurality of holes;
a second plurality of holes;
a third plurality of holes; and
a fourth plurality of holes;
wherein each hole of the first plurality of holes is substantially equal in size to each hole of the third plurality of holes, wherein each hole of the second plurality of holes is substantially equal in size to each hole of the fourth plurality of holes, wherein each hole of the first and the third pluralities of holes is different in size than each hole of the second and the fourth pluralities of holes, and wherein the adaptor plate is coupled to the rail structure of the generator system.

5. The adaptor of claim 4, wherein the at least one protruding feature includes at least two protruding features disposed in each of the front side and the back side.

6. The adaptor of claim 4, wherein the at least one recess portion includes at least two recess portions disposed in the front side, the back side, or both.

7. The adaptor of claim 4, the substantially rectangular plate further comprising a trunnion recess disposed therein.

8. The adaptor of claim 4, further comprising at least one weight reduction feature disposed therein, wherein a thickness of the substantially rectangular plate is between 2 and 16 inches thick.

9. The adaptor of claim 4, wherein the substantially rectangular plate at least partially comprises A36 steel.

10. The adaptor of claim 4, wherein the at least one protruding feature includes at least two protruding features disposed in each of the front side and the back side; and the at least one recess portion includes at least two recess portions disposed in the front side, the back side, or both; and wherein the substantially rectangular plate further includes a trunnion recess disposed therein, wherein a thickness of the substantially rectangular plate is between 2 and 16 inches thick, and wherein the substantially rectangular plate at least partially comprises A36 steel.

11. The generator system of claim 1, wherein the structural foot includes a top recess portion and a bottom recess portion each including a respective plurality of holes aligning with and correspond to the respective plurality of holes of the first protruding feature and the second protruding feature of the adaptor plate.

12. The generator system of claim 1, wherein the rail structure-facing side of the adaptor plate includes a first recess portion and a second recess portion coupled to the top rail and the bottom rail of the rail structure, respectively.

13. A generator system comprising:
an electrical generator;
a generator casing disposed around the electrical generator;
a rail structure axially disposed on an outer surface of the generator casing;
an adaptor plate coupled to the rail structure, the adaptor plate further comprising:
at least one recess portion;
at least one protruding feature; and
at least one plurality of holes entirely disposed therethrough; and
a structural foot coupled to the adaptor plate, wherein the at least one plurality of holes of the adaptor plate further includes four plurality of holes with each plurality of the four plurality of holes radially spaced from each other, the four plurality of holes further including:
a first plurality of holes;
a second plurality of holes;
a third plurality of holes; and
a fourth plurality of holes;
wherein each hole of the first plurality of holes is substantially equal in size to each hole of the third plurality of holes,
wherein each hole of the second plurality of holes is substantially equal in size to each hole of the fourth plurality of holes, and
wherein each hole of the first and third pluralities of holes is different in size than each hole of the second and fourth pluralities of holes.

14. The generator system of claim 13, wherein the structural foot is coupled to the adaptor plate through the first and the third plurality of holes, and wherein the rail structure is coupled to the adaptor plate through the second and the fourth plurality of holes.

15. The generator system of claim 13, wherein the adaptor plate has a structural foot-facing side, wherein the at least one protruding feature of the adaptor plate includes a first protruding feature and a second protruding feature radially spaced from the first protruding feature, and wherein the first protruding feature and the second protruding feature are disposed on the structural foot-facing side of the adaptor plate and include the first and the third pluralities of holes disposed therethrough, respectively.

16. The generator system of claim 15, wherein the structural foot includes a top recess portion and a bottom recess portion each including a plurality of holes aligning with and correspond to the first and the third pluralities of holes in the adaptor plate, respectively.

17. The generator system of claim 13, wherein the adaptor plate has a rail structure-facing side, wherein the at least one recess portion of the adaptor plate includes a first recess portion and a second recess portion radially spaced from the first recess portion, and wherein the first recess portion and the second recess portion are disposed on the rail structure-facing side of the adaptor plate and include the second and the fourth pluralities of holes disposed therethrough, respectively.

18. The generator system of claim 17, wherein the rail structure includes a first rail and a second rail radially spaced from the first rail, the first and the second rails each including a plurality of holes aligning with and correspond to the second and the fourth pluralities of holes in the adaptor plate, respectively.

19. The generator system of claim 13, wherein the adaptor plate includes a rail structure-facing side and an opposite, structural foot-facing side, and wherein the at least one protruding feature includes at least two protruding features disposed in the rail structure-facing side, the structural foot-facing side, or both.

* * * * *